(12) United States Patent
Jerolm

(10) Patent No.: US 11,233,674 B2
(45) Date of Patent: Jan. 25, 2022

(54) PROCESSING OF PROCESS DATA

(71) Applicant: WAGO Verwaltungsgesellschaft mbH, Minden (DE)

(72) Inventor: Daniel Jerolm, Bad Essen (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 122 days.

(21) Appl. No.: 16/694,065

(22) Filed: Nov. 25, 2019

(65) Prior Publication Data

US 2020/0092137 A1 Mar. 19, 2020

Related U.S. Application Data

(63) Continuation of application No. PCT/EP2018/062958, filed on May 17, 2018.

(30) Foreign Application Priority Data

May 24, 2017 (DE) .................... 10 2017 208 831.1

(51) Int. Cl.
*H04L 12/42* (2006.01)
*H04L 12/40* (2006.01)
*H04L 12/24* (2006.01)
*G06F 13/362* (2006.01)
(Continued)

(52) U.S. Cl.
CPC ............ *H04L 12/42* (2013.01); *G06F 9/3836* (2013.01); *G06F 9/546* (2013.01); *G06F 13/362* (2013.01); *H04L 12/40163* (2013.01); *H04L 41/0803* (2013.01); *H04L 2012/4026* (2013.01)

(58) Field of Classification Search
CPC ............... H04L 12/42; H04L 12/40163; H04L 41/0803; H04L 2012/4026; G06F 9/3836; G06F 9/546; G06F 13/362
See application file for complete search history.

(56) References Cited

U.S. PATENT DOCUMENTS

| 5,472,347 A | 12/1995 | Nordenstrom et al. |
| 6,282,709 B1 | 8/2001 | Reha et al. |
| (Continued) | | |

FOREIGN PATENT DOCUMENTS

| DE | 102 18 816 A1 | 2/2003 |
| DE | 698 13 504 T2 | 12/2003 |
| (Continued) | | |

*Primary Examiner* — Rasheed Gidado
(74) *Attorney, Agent, or Firm* — Muncy, Geissler, Olds & Lowe, P.C.

(57) ABSTRACT

A method for processing process data by means of data bus subscribers of a local bus, the method including: receiving at least one instruction list at a data bus subscriber, the instruction list having a set of instructions for processing process data, storing the at least one instruction list in a memory, receiving an instruction list index, ILI, at the data bus subscriber, selecting one of the at least one stored instruction list on the basis of the received ILI if the ILI is associated with the stored instruction list, and executing the set of instructions of the selected instruction list in order to process the process data by means of the data bus subscriber. The local bus is designed as a ring bus, for example. Each output of a data bus subscriber is connected, for example, to an actuator.

19 Claims, 4 Drawing Sheets

(51) Int. Cl.
*G06F 9/38* (2018.01)
*G06F 9/54* (2006.01)

(56) References Cited

U.S. PATENT DOCUMENTS

| | | | |
|---|---|---|---|
| 6,793,387 B1* | 9/2004 | Neas | B01F 13/1058 |
| | | | 141/104 |
| 6,957,115 B1* | 10/2005 | Meyer-Grafe | G05B 9/03 |
| | | | 370/216 |
| 8,019,487 B2 | 9/2011 | Goto et al. | |
| 8,626,882 B2* | 1/2014 | Jiang | H04L 41/0816 |
| | | | 709/222 |
| 9,372,682 B2 | 6/2016 | Sohm | |
| 2002/0029329 A1* | 3/2002 | Cho | G06F 9/30145 |
| | | | 712/24 |
| 2002/0198970 A1 | 12/2002 | Kuwa | |
| 2005/0025139 A1* | 2/2005 | Brueckner | H04L 12/40 |
| | | | 370/362 |
| 2011/0231509 A1* | 9/2011 | Schriefer | H04L 12/403 |
| | | | 709/211 |
| 2012/0151017 A1* | 6/2012 | Naismith | H04L 12/40169 |
| | | | 709/220 |
| 2013/0208724 A1 | 8/2013 | Colucci et al. | |
| 2017/0135185 A1* | 5/2017 | Dunser | H05B 31/50 |

FOREIGN PATENT DOCUMENTS

| | | |
|---|---|---|
| DE | 10 2006 051 974 A1 | 8/2007 |
| DE | 10 2010 030 811 A1 | 1/2012 |
| DE | 10 2010 043 011 A1 | 3/2012 |
| EP | 2 093 941 A1 | 8/2009 |

\* cited by examiner

PROCESSING OF PROCESS DATA

This nonprovisional application is a continuation of International Application No. PCT/EP2018/062958, which was filed on May 17, 2019, and which claims priority to German Patent Application No. 10 2017 208 831.1, which was filed in Germany on May 24, 2017, and which are both herein incorporated by reference.

BACKGROUND OF THE INVENTION

Field of the Invention

The present invention relates to the processing of process data, and more particularly to the processing of process data at data bus subscribers of a local bus with the aid of instruction lists.

Description of the Background Art

A local bus is generally used in an automation system. Automation systems are used in particular for the control of industrial installations, buildings and means of transport. For the control of an automation system usually several sensors and actuators are necessary. These monitor and control the process performed by the system. The different sensors and actuators of an automation system are often referred to as automation devices.

These automation devices can either be connected directly to a controller of the automation system or can first be connected to input and output modules, which are often referred to as I/O modules. These in turn can be connected directly to the controller. The automation devices can either be integrated directly in the I/O modules or can be connected to them via wire or wirelessly.

The control of an automation system is usually accomplished with the help of one or more programmable logic controllers, PLC. The PLCs can be arranged hierarchically or decentrally in an automation system. There are different performance levels for the PLC, so that they can take over different controls and regulating techniques depending on the computing and storage capacity. A PLC in the simplest case has inputs, outputs, an operating system (firmware) and an interface through which a user program can be loaded. The user program determines how the outputs are to be switched in dependence on the inputs. The inputs and outputs can be connected to the automation devices and/or the I/O modules, and the logic stored in the user program can be used to monitor or control the process performed by the automation system. In this case, the monitoring of the process is accomplished by the sensors and the control of the process is done by the actuators. The controller can also be referred to as a central controller or central unit and assumes control of at least one automation device or I/O module connected to the controller.

However, the direct connection of the automation devices with the at least one controller or the I/O modules with the at least one controller in the form of a parallel wiring, i.e., in each case one line is routed from each automation device or each I/O module to the higher-level control, is very expensive. Especially with the increasing degree of automation in automation systems, the wiring effort increases with parallel wiring. This is associated with great expense in the design, installation, commissioning and maintenance.

For this reason, automation systems generally use bus systems today with which the automation devices or the I/O modules can be connected to the controller. In order to simplify the connection of the individual automation devices or the I/O modules with the bus system even further, nowadays, individual groups of automation devices or I/O modules are initially interconnected to a local bus system using a specialized local bus. Subsequently, at least one subscriber of this local bus is connected to the bus system, which is connected to the controller. In this case, the local bus system may differ from the bus system, which is used to realize the connection with the controller.

The subscriber of a group of local bus subscribers connected to the bus system of the controller is often referred to as a local bus master. Alternatively, the term header of the local bus system is used. This local bus master can contain logic, circuits or functionalities that are different from other local bus subscribers, which are necessary for connection to the bus system of the controller. Also, the local bus master itself may include a PLC. This subscriber can also have logic and circuits for conversion between the two bus systems. The local bus master can therefore also be designed as a gateway or bus converter and ensures conversion of the data present in the format of the one bus system to the format of the local bus system and vice versa. Usually, but not mandatory, the local bus master is specialized in connecting the local bus to the higher-level bus.

The local buses used are mostly tailored to the specific use requirements of the automation devices or I/O modules or take into account their special hardware configuration. The groups on automation devices or I/O modules of the local bus system usually form a subgroup of the automation system for the execution of a special task in the process performed by the automation system. The data exchanged on the buses for the process is also often referred to as local bus data or process data, because this data contains information for controlling or regulating the process executed by the automation system. Among other things, this data may include measurement data, control data, status data and/or other information. Depending on the bus protocol used, this data may be preceded (header) or appended (tail) by other data. This other data may include information regarding the data or include information regarding internal communication on the local bus. Here, a variety of different information is known, which can be prefixed or appended to the data according to the bus protocol used. The local bus subscribers connected to a local bus can also be referred to as data bus subscribers because they exchange data on the local bus. A data bus subscriber can serve for controlling or monitoring a process, in particular by outputting control signals, for example, to actuators and/or by receiving measurement signals, for example, from sensors. The data bus subscriber converts the control signals and/or measurement signals into data for the local bus or vice versa. The data bus subscribers can also be referred to as local bus subscribers.

One example of a local bus is a ring bus, which is a specialized form of local bus, as known for example from U.S. Pat. No. 5,472,347 A. In a ring bus, the data bus subscribers, for example, the automation devices or I/O modules, are each connected to their directly adjacent data bus subscribers and data is forwarded in succession from one data bus subscriber to the other. Thus, not all data bus subscribers are sent the data at the same time, but in turn, wherein a data bus subscriber receives data from its upstream data bus subscriber and forwards data to its downstream data bus subscriber. Between receiving the data and forwarding, the data bus subscriber can process the received data. When the data has reached the last data bus subscriber in the series, the data from the last data bus subscriber is returned back to the first data bus subscriber in succession. The return can either be done through all data bus subscribers or past them with the help of a bypass line. Thus, the ring bus has a downward flow and an upward flow of data. The data in a ring bus is usually transmitted in the form of data packets that cycle through all data bus subscribers.

Each data bus subscriber has a fixed, i.e., static, programming for processing the process data contained in the data packets. If this is to be changed, then the data bus subscriber must be reprogrammed, for example as part of a firmware update, or the data bus subscriber must be replaced. In known ring bus systems, this leads to the fact that the work of the ring bus must be interrupted. The process of the automation system executed by the ring bus is accordingly interrupted for a certain time.

SUMMARY OF THE INVENTION

It is an the object of the present invention to provide a method with which the greatest possible reduction in interruption times of the executed process is possible.

The method according to an exemplary embodiment of the invention for the processing of process data by data bus subscribers of a local bus, in particular of a ring bus, includes the reception of at least one instruction list at a data bus subscriber, wherein the at least one instruction list contains a set of instructions for the processing of process data. In this case, the set of instructions may contain only one instruction. The instruction list can be received via an interface for connection to the local bus, for example via a communication with a local bus master of the local bus. Preferably, the communication takes place by means of addressing in that the local bus master, for example, sends the instruction list to the address of the data bus subscriber. Alternatively, it is possible to receive the instruction list via an interface other than the interface for the connection to the local bus. For example, the instruction can be received via a separate programming interface of the data bus subscriber. The instructions of the instruction list can specify different processing steps which are to be performed with the process data. In this case, the at least one instruction list contains instructions which specify a set of rules for the processing of the process data. The set of rules defines, for example, which process data a data bus subscriber should select from a data stream cycling through on the local bus, which data is to be read or to which locations process data is to be written by the data bus subscriber and/or which process data the data bus subscriber should manipulate in other ways. A data bus subscriber can also receive multiple instruction lists. Each data bus subscriber, depending on the tasks to be performed by this data bus subscriber, can have several different instruction lists, wherein each of the instruction lists can define a different behavior of the data bus subscriber in respect of the process data to be processed.

The inventive method further comprises storing the at least one instruction list in a memory. The storage can include all types of holding of the received at least one instruction list. It is only important that the data bus subscriber have access to the received at least one instruction list, i.e., have access to the memory. Accordingly, the at least one instruction list may be stored in the data bus subscriber itself, for example in a memory of the data bus subscriber or in a memory connected to the data bus subscriber. The connection between data bus subscribers and memory can be wired or wireless. It is also conceivable that the memory is an additional module which can be connected to the data bus subscriber. The memory can be configured as desired.

The inventive method further comprises receiving from an instruction list index. This instruction list index informs the data bus subscriber regarding which stored instruction list to use for processing process data. An instruction list index is thus assigned to an instruction list or vice versa, so that the instruction list to be used can be identified with the aid of the instruction list index. For this purpose, the instruction list index preferably has a value which is assigned to an instruction list, for example, the value indicates a specific instruction list or its memory location. For this purpose, the value itself may be the memory address where the instruction list is stored or where at least a first instruction of the instruction list is stored. Alternatively, or additionally, the value can also indicate a memory area in which the corresponding instruction list is stored. In the previously mentioned cases, it is also possible to speak of a direct assignment. The value of the instruction list index may, for example, also be used as input of a conversion table (Look-Up Table, LUT). The value of the instruction list index is the input value of the conversion table. The output value of the conversion table can be the memory address of the first instruction in the associated instruction list or otherwise identify the instruction list. The conversion table may be stored with software and hardware technology in the form of, for example, logic and indicate a one to one implementation of an input value into an output value, wherein the output value provides information on which instruction list is to be used. It depends on the conversion table as to how a connection between the instruction list index and the instruction list is produced. With the use of a conversion table, one can also speak of an indirect assignment. In the case of direct and indirect assignment, however, the instruction list to be used by the data bus subscriber is uniquely identifiable, i.e., can be found, via the instruction list index. For example, exactly one instruction list index can always be assigned to exactly one instruction list or vice versa. This means that with each instruction list index, at least one instruction list can be found or unambiguously identified.

Further, the inventive process comprises selecting one of the at least one stored instruction lists based on the received instruction list index. A stored instruction list is therefore selected when the instruction list index is assigned to the stored instruction list, for example by means of the LUT. The selected instruction list is then executed by the data bus subscriber for processing process data received by the data bus subscriber. Therefore, the set of instructions of the selected instruction list is executed. If the instruction list index contains a reference to an instruction list which does not exist on the data bus subscriber, then the data bus subscriber can report an error. Also, the data bus subscriber can ignore the instruction list index and not execute an instruction list for the process data. In the latter case, the process data received from the data bus subscriber remains unchanged.

With the help of the instruction lists that can be sent to each data bus subscriber during operation, it is possible to program the data bus subscriber without interrupting the cyclic data transmission via the local bus to execute a process. The instruction lists can be reloaded during operation or the instruction lists not mapped to the instruction list index currently used can be changed or removed. With the help of the instruction list index it is then possible to seamlessly transition from one to the other instruction list. For this purpose, it is only necessary to send the associated instruction list index after storage of the new instruction lists. A new initialization or interruption of the local bus is not necessary. With the help of switching the processing by means of the instruction lists it is also possible to adapt the operation of the ring bus for different controls. With the method according to the invention, it is therefore particularly easy to enable reprogramming or reconfiguration and to add and remove data bus subscribers of a ring bus even during operation.

The process data to be processed can be received in a data packet. A data packet which carries process data can also be referred to as a process data packet. The process data packet includes the process data which is sent and/or received by the data bus subscribers of the local bus. Advantageously, the process data packet does not contain an address for the transmission of process data to or from a data bus subscriber of the local bus. In the process data packet, the process data is arranged such that data bus subscribers can identify the process data associated with the respective data bus subscriber on the basis of the respective location of the process data in the process data packet, for example, one or multiple bits within an associated contiguous data block (1 byte). Advantageously, the process data packet comprises an identifier (IDE) that is associated with the type of data packet, i.e., is associated with the process data packet and is identifiable by the data bus subscriber.

The instruction list index can be received either right before the process data or at a defined interval before the process data. The instruction list index and the process data can be arranged in the same process data packet. Alternatively, the instruction list index can also be received separately from the process data. This is particularly advantageous if the instruction list index does not change for each data packet or even for each cycle frame. In this case, the instruction list index may also be sent only once, and this instruction list index is then used by the data bus subscribers for the processing of process data until a new instruction list index is received. However, stringent coupling of the instruction list index with the process data to be processed is preferred. If in this case a process data packet without an instruction list index is received, the data bus subscriber can report an error, or the data bus subscriber will ignore the process data.

The instruction list can be received in a data packet. A data packet carrying the instruction list may also be referred to as a communication data packet. A communication data packet carries no process data and is used in particular for programming and/or for controlling and/or for monitoring and/ or for identifying at least one data bus subscriber. Advantageously, the communication data packet has an address which is assigned to at least one data bus subscriber. Preferably, the data bus subscriber is set up to evaluate the address and process the communication data packet accordingly.

The process data packets, and the communication data packets can also be referred to as telegrams. A telegram has, for example, headers, payload and, advantageously, a checksum.

The process data packets, and the communication data packets can be sent to the data bus subscribers in a cycle frame communication. In this case, the respective data packets can be sent to the data bus subscribers in one or different cycle frames.

A cycle frame may be, for example, defined as a recurring (cyclic), preferably equidistant time interval in which data is transferable on the local bus. The cycle frame has, for example, at least one start identifier (SOC) and a time range for the transmission of data. Several start identifiers (SOC) of successive cycle frames are advantageously at a time equidistant from each other. The named time range is intended for the transmission of the data packets. The start identifier (SOC) and the data packets are transmitted via the local bus and pass through all the data bus subscribers. The start identifier (SOC) is separate, i.e., transferable as a stand-alone symbol or advantageously contained in a start packet (SOC package).

Within the time range of the cycle frame, none, one or more data packets are transmitted. Advantageously, idle data is inserted in a cycle frame, in particular adjacent to at least one data packet. Advantageously, the transmission of the data packets and/or the idle data causes an uninterrupted signal on the local bus. The signal allows for the data bus subscribers to synchronize to this time. Advantageously, the cycle frame additionally has a trailer. The trailer has a variable length and preferably follows the time range for data transmission up to the next start identifier (SOC) of the next cycle frame. Advantageously, the trailer contains idle data.

The cycle frames can be generated originally by the local bus master. As part of the generation, the local bus master inserts process data received from the controller, for example a PLC, into the corresponding process data packets of the cycle frames, but the process data can also come from the local bus master itself. During the passage of the process data packets through the data bus subscribers of the local bus, the process data, however, can change, caused by processing by the data bus subscribers, wherein said processing is predetermined by the instructions of the different instruction lists.

The process data packet and the communication data packet can have a number of symbols, each symbol having a number of bits, for example 8 bits, i.e., 1 byte. However, those skilled in the art will appreciate that the division of the data packets may also be done in other units comprising more or less than 8 bits. The data packets pass through the local bus in the form of these symbols, i.e., unit by unit, piecewise, or partwise. Such a part of the data packets is also referred to below as a piece or unit. This means that the data bus subscribers always have only a part of the data packets at any given time. In this case, a data bus subscriber receives the data packets symbol by symbol. After processing a symbol, the data bus subscriber forwards the symbol just processed to the downstream data bus subscriber and in the same step receives a new symbol from the upstream data bus subscriber, and so forth.

The instruction list index can be arranged in each data packet with process data at a predetermined location within the data packet. In this case, the data bus subscriber knows the predetermined location within the data packet. As a result, the data bus subscriber is advantageously set up to determine the predetermined location within the data packet and to read out the instruction list index at the predetermined location. Advantageously, the instruction list index is disposed within a data symbol that is loaded in its entirety into the data bus subscriber, so that with the evaluation of the data symbol, the instruction list index is available to the data bus subscriber for the selection of the instruction list. The predetermined location within the data packet is preferably defined by a certain distance from a unique recognizable part of the data packet. For example, the predetermined location is disposed by a constant number of bits or symbols at a distance from a recognizable head (header) or a recognizable identifier (IDE).

In an embodiment of the method according to the invention, storing the instruction lists additionally comprises creating a reference in the data bus subscriber.

The reference can be stored at a specific location in the memory of the data bus subscriber or in a register of the data bus subscriber. Alternatively, or additionally, the reference can also be stored in a memory connected to the data bus subscriber. The received instruction list index can then indicate, for example, the index of the corresponding reference and the reference itself can indicate the location in the memory or in the register in which the instruction list is stored, which is linked to the instruction list index. By means of the instruction list index, the corresponding instruction list can then be found by means of the reference. This way, the instruction list is indirectly associated with the instruction list index. In this case, for example, each data bus subscriber can have an indexable list of references in the memory, for example, 16 references, which are indexed by their location in the list. Which of the references should be used to select the instruction list is determined by the instruction list index. The instruction list index can, for example, have a value indicating the location of the reference in the indexed list. Accordingly, then, the reference to an instruction list is used that is held in the indexable list at the location given by the instruction list index.

Even if a list has been named as the memory object, the person skilled in the art is aware that any other indexable memory object can be used. If the instruction list index has a value for which the data bus subscriber does not have a corresponding instruction list and thus also has no reference, then the data bus subscriber can ignore the instruction list index and no instruction is executed. Alternatively, it is also possible in such a case that the data bus subscriber reports an error. The use of the reference has the advantage that the instruction list index to be transmitted can be kept very small in terms of data volume in the data packet, since the former must only index the appropriate reference. That is, an instruction list index can be assigned one or a plurality of instruction lists, because the data bus subscriber with the same instruction list index retrieves a different instruction list than another data bus subscriber. The assignment depends solely on the reference stored in the data bus subscriber.

The reference can also be used further. There may be times, for example, when some data bus subscribers have fewer instruction lists than others. However, so that different instruction list indexes do not have to be sent to different data bus subscribers, but instead all can work with the same instruction list index, the same references can be used for multiple instruction list indexes. In other words, even if the instruction list indexes are different, the reference that can be found via the instruction list index points to the same instruction list. Thus, it is not necessary to keep multiple copies of an instruction list.

In an embodiment, it is also conceivable that the storing of the instruction lists occurs at a predetermined location in the memory and that the instruction list index has a reference which points to the predetermined memory location. Here, the reference can be the memory address itself, or the instruction list index has a value which can be evaluated using hardware by the data bus subscriber, for example, by using logic, thus indicating the memory location where the instruction list is stored. In this case, it can be said that the memory location of the instruction lists is hard wired in the data bus subscriber and that the instruction list index causes the hardware of the data bus subscriber to use a specific instruction list associated with the instruction list index.

References can also be used to perform a seamless transition from a used instruction list to another instruction list. For example, when adding a data bus subscriber in the ring bus, a new instruction list can be sent to this new data bus subscriber by the local bus master, for example in a communication, i.e., in a communication in which no process data is sent to the data bus subscriber. The local bus master can instruct, for example at the same time, all the data bus subscribers previously located in the local bus to create a new reference, specifically a reference that can be found via an instruction list index not yet used. However, this new reference will be created in such a way that it points to the instruction list currently being used by the respective data bus subscriber. The memory object holding the references in this case has at least two references which point to the same instruction list, but which can be found via different instruction list indexes. The newly added data bus subscriber is also directed to create a reference to its newly received instruction list, wherein this reference can also be traced via the until then unused instruction list index. When this process is completed, the local bus master can use the instruction list index, which has not yet been used. The new data bus subscriber will then use its new instruction list, whereas the other data bus subscribers receive a new instruction list index, which, however, points to the reference indicating the previously used instruction list. These data bus subscribers therefore still use the same instruction list as they did before adding the other data bus subscribers. Alternatively, it is also possible that the previous data bus subscribers also receive new instruction lists, which are assigned to the new, previously unused instruction list index, for example, in the case when the process has new dependencies with the newly added data bus subscriber, for example, a newly required measurement to be taken into account. With the references, it is thus possible to produce a seamless transition during operation, even if a data bus subscriber is added.

Similarly, however, references can also be used if, in particular, new instruction lists are to be sent to the existing data bus subscribers or old ones are to be removed. This way, a seamless transition is again possible with the help of references in the data bus subscribers that are to use the same instruction lists or different instruction lists before and after a change. For this purpose, for example, the local bus master generates new instruction lists for the data bus subscribers. The local bus master can then send the new instruction lists to the data bus subscribers and instruct the data bus subscribers to create a new reference, namely a reference that can be found over an instruction list index not yet used. This new reference points to the newly received instruction list. From a certain point in time after the instruction, the local bus master can then use the previously unused instruction list index. That is, a reprogramming of the data bus subscriber is possible during ongoing operation without the occurrence of any interruptions. After the new instruction list index is used, the previously used instruction list index and thus the corresponding reference to the previously used instruction list can be released and the reference as well the previously used instruction list can be deleted or overwritten.

At least two instruction lists can be received by the data bus subscriber. In this case, a first instruction list of the at least two received instruction lists may include a first set of instructions for process data in a first arrangement within a process data packet, and the second instruction list of the at least two received instruction lists may include a second set of instructions for process data in a second arrangement within a process data packet. For example, the first arrangement and the second arrangement are received in two different, in particular successive, data packets. In this case, the first arrangement may be different from the second arrangement. For example, in a tool change on an actuator that is connected to a data bus subscriber, different processing might be necessary because in this case, other process data specific for the new tool, i.e., for example bits, is transmitted in the data packet. That is, the first instruction list can be used, for example, before the tool change, whereas the second instruction list is used after the tool change.

The use of different instruction lists can also be advantageous if the local bus master copies different arrangements of process data into the process data packet. For example, the local bus master may be connected to various controllers that use formats in which process data is arranged differently. For example, the bits of the process data in a fieldbus telegram can be arranged differently according to a first standard than in a fieldbus telegram according to a second standard. When the local bus master copies the process data from these formats into a corresponding process data packet, the first instruction list may be used for processing process data originating from the first controller and the second instruction list may be used for processing process data originating from the second controller. So that the data bus subscribers can process the process data in this case, the different instruction lists can be provided. However, it is also conceivable that a first instruction list is used for normal operation, whereas a second instruction list is used in the event of an error. Which of the instruction lists is to be used is displayed by means of the instruction list index.

The instruction list index can have a value from a fixed value range. For example, the instruction list index may originate from the bit value range between 0000 to 1111. However, it is clear to the person skilled in the art that other ranges of values can also be used. By using a reference in the data bus subscribers, the range of values used for the instruction list index can be minimized because, for example, it suffices to indicate the number of a reference. As a result, the amount of data for the instruction list index is minimized within the data packet. The person skilled in the art, however, is aware that other value ranges or other types of indexing can be used.

The above object is also achieved by a data bus subscriber of a local bus, in particular of a ring bus, wherein the data bus subscriber has a receiver for receiving at least one instruction list, the instruction list comprising a set of instructions for processing process data and a receiver for receiving an instruction list index. The receiver for receiving the at least one instruction list may be the same as for receiving the instruction list index, or may be different. In addition, the inventive data bus subscriber has a memory for storing the at least one instruction list. The data bus subscriber also has a selector for selecting a stored instruction list based on the received instruction list index when the instruction list index is associated with the stored instruction list. The data bus subscriber has an executor for executing the set of instructions of the selected instruction list for processing the process data.

In an embodiment of the invention, the one or more receivers for receiving can be, for example, a receiver circuit or a transceiver circuit. Advantageously, the memory for storing can be, for example, a semiconductor memory, in particular a RAM area within an integrated circuit. Advantageously, the selector for selecting can be, for example, an arithmetic circuit formed in particular of gate elements of an integrated circuit. The executor for executing can be, for example, an arithmetic circuit or a digital logic, which is in particular at least part of a semiconductor chip. The circuits are implemented by hardware circuitry, for example, in an application specific integrated circuit (ASIC) or a field programmable (logic) gate array (FPGA). The person skilled in the art is aware that the components for selecting and for carrying out can also be implemented by software, in particular by the programming of a microcontroller.

The data bus subscriber according to the invention can be set up for processing the process data. In this case, the data bus subscriber is adapted to at least read and/or to write process data within a data packet based on the set of instructions of the selected instruction list if the received ILI is associated with the stored instruction list.

The abovementioned object is also achieved by a local bus system, wherein the local bus system has a local bus master and at least one inventive data bus subscriber of a local bus described above. According to the invention, the local bus master has a generator for generating a data packet with an instruction list index and process data as well as a transmitter for transmitting the data packet to the at least one data bus subscriber. The generator for generating can be an arithmetic circuit, which can be formed, for example, from gate elements of an integrated circuit. The arithmetic circuit can be embodied as digital logic, which is designed, in particular, at least as a part of a semiconductor chip. The circuits may be implemented in an ASIC or an FPGA. The transmitter for transmitting can be, for example, a digital transmission circuit or a transceiver circuit.

The local bus master of the local bus system according to the invention further has a generator for generating at least an instruction list for a data bus subscriber. The local bus master can generate instruction lists based on knowledge about the data bus subscriber. The instructions include operations that the data bus subscriber is intended to perform with the process data. The local bus master can thus specify the behavior/program sequence of the individual data bus subscribers on the basis of the instruction lists. The instruction lists may contain different instructions. In this case, the instruction lists can each have an instruction for each process data item in the data packet. If the data bus subscriber, for example, is not intended to perform any processing with a process data item, for example, a bit, then the corresponding instruction list for this process data item can be empty or contain a "SKIP" instruction. The instruction list may also contain the number of repetitions for a particular instruction. For example, the instruction list can contain a "SKIP" instruction with the notice to repeat this twice. In this case, the next two process data items are not processed, but skipped. It will be appreciated by those skilled in the art that any number of instructions is possible that is more or less complex. The operations that can be performed, for example, are based on a reduced instruction set that the data bus subscriber can run, for example, "SKIP", "MOVE", "NEGATION", "INCREMENT", "AND" and "OR" or a combination thereof. The skilled person is also aware that the instructions may be predetermined as functionality in the data bus subscribers and that the instruction lists only have corresponding codes which instruct the data bus subscriber to execute very specific instructions. The generator for generating the instruction lists may be, for example, a processor, a microcontroller or a computing circuit, which can in particular be formed of gate elements of an integrated circuit. A manual creation of instruction lists is also conceivable. The arithmetic circuit may be configured as a digital logic, which in particular is formed at least as a part of a semiconductor chip. The circuits may be implemented in an ASIC or an FPGA.

The local bus master of the local bus system according to the invention further can have a detector for detecting, which recognizes that at least one instruction list index is not assigned an instruction list. Such an instruction list index may also be referred to as a free or unused instruction list index. The detector for detecting may comprise, for example, a memory having information regarding the instruction lists used in the data bus subscribers. For example, the memory may have a specific area for each data bus subscriber. In this area, there may be an entry for each list stored on the data bus subscriber, which is not empty. Then the detector for detecting can recognize that only the empty spots can still be populated with instruction lists. The entries can be of different complexity. For example, the entries may only indicate that an instruction list associated with a particular instruction list index exists, or a complete copy of the instruction list may be stored. The entries can be sent by the data bus subscribers themselves to the local bus master. The data bus subscriber itself may prevent instruction lists from being inadvertently overwritten. This detector can detect, which indexable references do not yet have entries, and only the empty references can be used to store instruction lists.

With the aid of the detector for detecting, the local bus master can identify instruction list indexes that are not yet being used, that is, for which there are also no corresponding instruction lists or references yet in the data bus subscribers. These free instruction list indexes may be used when the local bus master transmits new instruction lists to the data bus subscribers. In this case, the detector for detecting can be, for example, a processor, a microcontroller, or an arithmetic circuit, wherein the arithmetic circuit may be formed in particular of gate elements of an integrated circuit. The arithmetic circuit can be embodied as digital logic, which is designed, in particular, at least as a part of a semiconductor chip. The circuits may be implemented in an ASIC or an FPGA.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
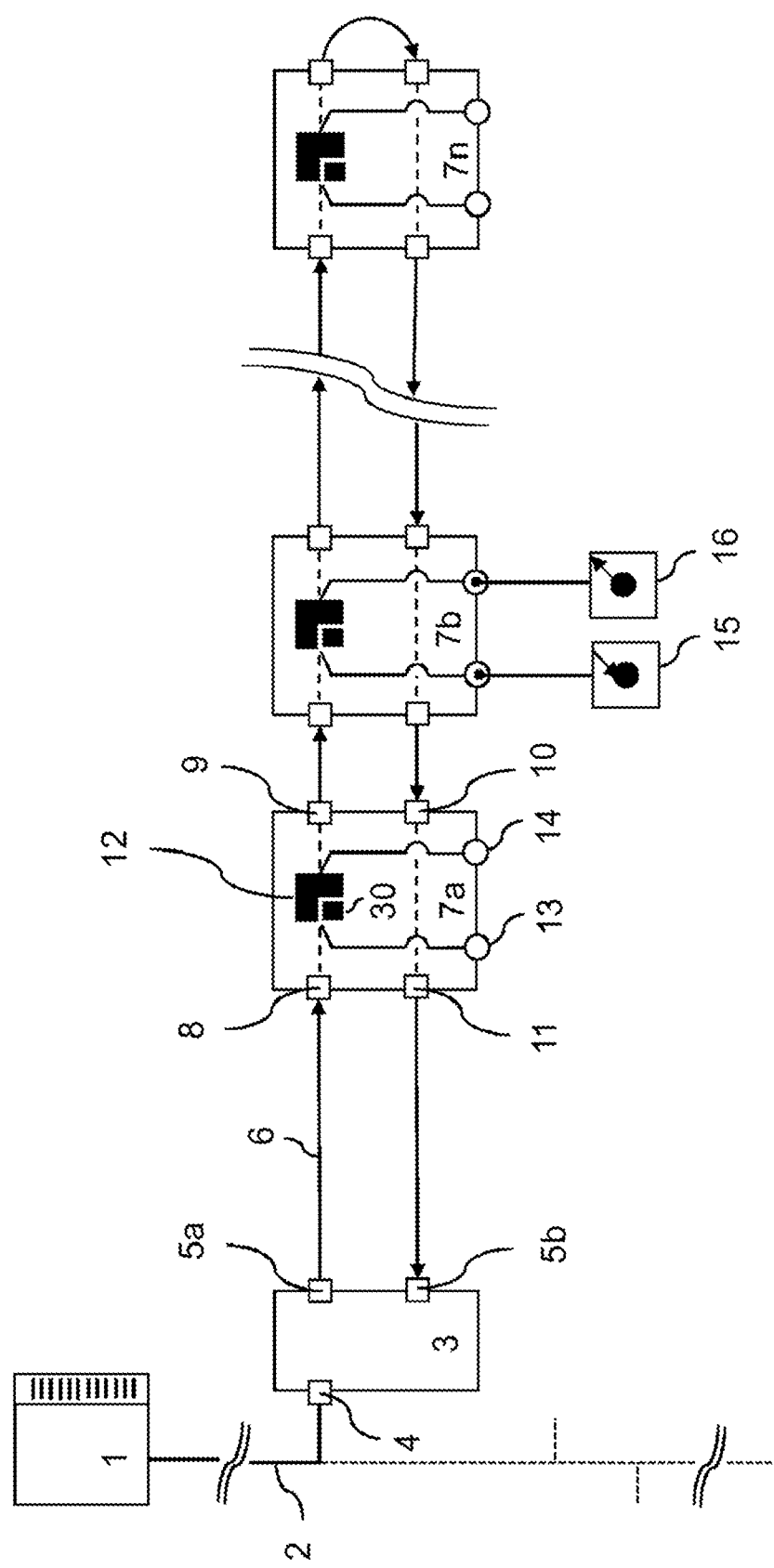
FIG. 1 is a schematic block diagram of an exemplary automation system with a programmable logic controller and an exemplary ring bus.

FIG. 1 shows a schematic block diagram of an automation system. It will be understood by the person skilled in the art that the automation system shown is merely exemplary, and all the elements, modules, components, subscribers and units associated with the automation system can be configured in different ways but can nevertheless fulfill the basic functionalities described herein.

The automation system shown in FIG. 1 has a higher-level control 1, which can be realized for example with a programmable logic controller, PLC. Such a PLC 1 is generally used to control and regulate the process executed by the automation system. However, PLCs 1 in automation systems today also take on further functions, such as visualization, alerts and recording of all data relating to the process, and as such, the PLC 1 functions as a human-machine interface. There are PLCs 1 of different power levels, which contain different resources (computing power, memory capacity, number and type of inputs and outputs, and interfaces), which enable the PLC 1 to control and regulate the process of the automation system. A PLC 1 usually has a modular design and is formed of individual components, each fulfilling a different task. Typically, a PLC 1 includes a central processing unit (with one or more main processors and memory modules) and multiple modules with inputs and outputs. Such a modular PLC 1 can be easily expanded by adding modules. In this case, it depends on the complexity of the process and the complexity of the structure of the automation system as to which modules must be integrated in the PLC 1. In today's automation systems, the PLC 1 is also usually no longer an independent system, but instead the PLC 1 is connected via appropriate interfaces to the Internet or intranet. This means that the PLC 1 is part of a network over which or from which the PLC 1 can obtain information, instructions, programming etc. For example, the PLC 1 may receive information about the materials supplied to the process via a connection to a computer located on the intranet or the Internet, so that the process can be optimally controlled, for example, by knowing their number or the nature thereof. It is also conceivable that the PLC 1 is controlled by an access from the intranet or Internet by a user. For example, a user using a computer, also called a host computer, can access the PLC 1 and check, change, or correct its user programming. Accordingly, access to the PLC 1 from one or more remote control units or control centers is possible. The host computers may optionally have visualization facilities for displaying process flows.

To control the process of the automation system, the PLC 1 is connected to automation devices. In order to keep the wiring costs low, bus systems are used for these connections. In the exemplary embodiment shown in FIG. 1, the PLC 1 is connected to a local bus master 3 of a subordinate local bus system by means of a higher-level bus 2, which may be a field bus in the exemplary embodiment shown here. However, not only a local bus master 3 of a local bus can be connected to the higher-level bus 2, as is the case in the exemplary embodiment shown here, but also any other subscribers that are configured for communication with the PLC 1.

The higher-level bus 2 is connected to the local bus master 3 in the exemplary embodiment shown here. For this purpose, the local bus master 3 has a first interface 4, which is designed such that it can be connected to the higher-level bus 2. For this purpose, the interface 4 can have, for example, a receptacle in the form of a socket, and the higher-level bus 2 can have a plug which can be received by the socket. In this case, the plug and the socket may be, for example, a modular plug and a modular socket, i.e., each wire of the higher-level bus 2 is electrically or optically connected to a connection in the modular socket. However, the person skilled in the art also knows other ways in which an interface 4 is to be designed so that the local bus master 3 can be electrically or optically connected to the higher-level bus 2. The skilled person knows screw, turn, click or plug connections, with the help of which an electrical or optical can be made. In most cases, a male plug is accommodated by a female counterpart. This receptacle mostly not only establishes the electric or optical connection, but also ensures that the two parts are mechanically coupled and can only be again released from each other with the application of a predetermined force. But it is also conceivable that the higher-level bus 2 is hardwired to the interface 4.

The local bus master 3 in the exemplary embodiment shown here has a further second interface in order to connect the local bus master 3 to the local bus. The data bus subscribers 7a, 7b, . . . , 7n are connected to the local bus or form this. The local bus is advantageously configured such that a data packet sent from the local bus master 3 is sent through all data bus subscribers 7a, 7b . . . , 7n connected to the local bus and back to the local bus master 3. In this case, a data bus subscriber 7a, 7b, . . . , 7n receives only a part of the data packet from its upstream data bus subscriber 7a, 7b, . . . , 7n. After a period in which the data contained in this part can be processed by the data bus subscriber 7a, 7b, . . . , 7n, the part is forwarded to the downstream data bus subscriber 7a, 7b, . . . , 7n and simultaneously, the upstream data bus subscriber 7a, 7b, . . . , 7n receives a new part of the data packet. In this way, all parts of the data packet sequentially pass through all data bus subscribers 7a, 7b, . . . , 7n. The local bus is advantageously formed in an annular structure. Such local buses can also be referred to as a ring bus 6. The local bus may alternatively be formed strand-shaped or star-shaped or from a combination or hybrid form of the aforementioned. The transmission and reception of the data packets is accomplished via the second interface of the local bus master 3. In the exemplary embodiment shown here, the second interface is divided into a first part 5a and a second part 5b. The first part 5a of the second interface establishes the downlink in the ring bus 6 and the second part 5b of the second interface establishes the uplink in the ring bus 6.

The ring bus 6, whose data transmission direction is shown by arrows in the embodiment shown in FIG. 1, has a plurality of data bus subscribers 7a, 7b, . . . , 7n in the exemplary embodiment shown here. In the exemplary embodiment shown here, these data bus subscribers 7a, 7b, . . . , 7n each have an interface 8 for receiving data from an upstream or preceding data bus subscriber 7a, 7b, . . . , 7n. In the case of data bus subscriber 7a, this receives data via the interface 8 from the upstream local bus master 3. Further, in the exemplary embodiment shown here, the data bus subscribers 7a, 7b, . . . , 7n each comprise an interface 9 so as to forward data to a downstream or subsequent data bus subscriber 7a, 7b, . . . , 7n. In the case of data bus subscriber 7a, this data is sent to the downstream data bus subscriber 7b via the interface 9. The interfaces 8 and 9 serve to propagate data in the downlink direction of the ring bus 6, i.e., away from the local bus master 3. Further, the data bus subscribers 7a, 7b, . . . , 7n in this exemplary embodiment also comprise interfaces 10 and 11, for propagating data in the uplink direction of the ring bus 6, i.e., towards the local bus master 3. In the case of the data bus subscriber 7a, interface 10 is designed to receive data from the downstream or subsequent data bus subscriber 7b, and interface 11 is designed to forward data to the upstream or preceding data bus subscriber, here the local bus master 3. It can therefore also be said that the interfaces 9 and 11 are transmitter interfaces, whereas the interfaces 8 and 10 are receiver interfaces.

In the exemplary embodiment shown here, the connections of the interfaces and the PLC 1 or the data bus subscribers 7a, 7b, . . . , 7n are realized by means of cables or printed circuit boards and/or for direct or indirect contacting by means of electrical contacts. Another alternative is that the individual connections are made wirelessly, and the interfaces provide the necessary conversions to the radio standards used.

Even if the local bus master 3 and the individual data bus subscribers 7a, 7b, . . . , 7n are shown spaced apart from one another in the exemplary embodiment shown here, i.e., the local bus master 3 is arranged in a decentralized manner from the data bus subscribers 7a, 7b, . . . , 7n, the skilled person will realize that the data bus subscribers 7a, 7b, . . . , 7n and the local bus master 3—which also represents a data bus subscriber of the ring bus 6—can also be connected directly to each other. In this case, for example, contacts of the one data bus subscriber can engage in corresponding receptacles or receptacle contacts of a directly adjacent data bus subscriber so as to make an electrical connection between the data bus subscribers, so that data can be sent in the uplink and downlink directions. For example, the data bus subscribers 7a, 7b, . . . , 7n can have receptacles on the side facing away from the master and contacts on the side facing the master. If the data bus subscribers 7a, 7b, . . . , 7n are then lined up accordingly, the contacts of the one data bus subscriber 7a, 7b, . . . , 7n respectively engage in the receptacles of the other data bus subscriber 7a, 7b, . . . , 7n and an electrical connection can be generated. The local bus master 3 then has corresponding contacts on the side which engage in the receptacles of the first data bus subscriber 7a so as to generate an electrical connection between the interfaces 5a and 8 or the interfaces 5b and 11. The person skilled in the art is also aware of other options such as pressure contacts, blade and fork contacts, as to how two data bus subscribers 7a, 7b, . . . , 7n arranged directly adjacent to each other can produce an electrical or also optical connection by means of corresponding components.

In case the data bus subscribers 7a, 7b, . . . , 7n and the local bus master 3 are to be connected directly to each other, these may also comprise mechanical receptacles or mechanical fastener, with which the individual data bus subscribers 7a, 7b, . . . , 7n and the local bus master 3 can be connected to each other. Here, for example, a data bus subscriber 7a, 7b, . . . , 7n can have a projection on one side and have an undercut on the other side. If the data bus subscribers 7a, 7b, . . . , 7n are then lined up, a projection engages in an undercut of the other data bus subscriber 7a, 7b, . . . , 7n, so that a mechanical coupling is produced. For a simple juxtaposition of the data bus subscribers 7a, 7b, . . . , 7n, these can also be arranged on a common receptacle, for example a DIN rail. For attachment to the DIN rail, the data bus subscribers 7a, 7b, . . . , 7n can have corresponding fasteners. Alternatively, or in addition, the data bus subscribers 7a, 7b, . . . , 7n can also have, for example, detachably connectable fasteners with which the data bus subscribers 7a, 7b, . . . , 7n can be mounted either to the DIN rail or to another receptacle. For this purpose, the releasably connectable fastener may be interchangeable and a corresponding fastener for the desired receptacle can be connected to the data bus subscribers 7a, 7b, . . . , 7n, so that they can be attached to the desired receptacle.

Further, in the exemplary embodiment shown in FIG. 1, the data bus subscribers 7a, 7b, . . . , 7n comprise a processing unit 12. This processing unit 12 can be an arithmetic logic unit or another type of arithmetic unit with which data can be processed. The processing unit 12 is preferably an integral part of the data bus subscriber 7a, 7b, . . . , 7n in order to ensure a particularly fast and time-synchronized processing of the data. The processing unit 12 may also include a microcontroller.

The processing unit 12 may also be referred to as the overall circuit of the data bus subscriber. That is, the processor 12 receives data through the inputs 8 and 10 and outputs data on the outputs 9 and 11. In addition, the processing device 12 may receive or output data from the inputs/outputs 13 and 14, respectively. Furthermore, the processing unit 12 has access to a memory 30 of the data bus subscriber 7a, 7b, . . . , 7n in which, for example, data, process data, or instruction lists are stored.

The processing unit 12 may be configured to process received data and to output data. Data to be processed may be received from either an upstream data bus subscriber or from inputs 13 of the data bus subscriber 7a, 7b, . . . , 7n. In this case, the inputs 13 of the data bus subscriber 7a, 7b, . . . , 7n can be connected to sensors 15, which transmit, for example, measurement data, status data, etc. Processed data can be output to either a downstream data bus subscriber or at outputs 14 of the data bus subscriber 7a, 7b, . . . , 7n. In this case, the outputs 14 of the data bus subscriber 7a, 7b, . . . , 7n can be connected with actuators 16, which, for example, perform a specific action using the data addressed to them. If data processing is also to take place in the uplink direction, data can also be received by a downstream data bus subscriber 7a, 7b, . . . , 7n and processed data can be sent to an upstream data bus subscriber 7a, 7b, . . . , 7n.

For the sake of simplicity, in the exemplary embodiment shown here, the data bus subscribers 7a, 7b, . . . , 7n are shown with only one input 13 and one output 14, and only data bus subscribers 7b are connected to sensor 15 and actuator 16. It is, however, known to the skilled worker that the data bus subscribers 7a, 7b, . . . , 7n can have a plurality of inputs and outputs 13 and 14, and can be connected to a plurality of different sensors 15 and actuators 16. In this case, the feature characterizing the sensors 15 is that the sensors 15 record data or signals and send them to the data bus subscribers 7a, 7b, . . . , 7n, whereas actuators 16 receive data or signals from the data bus subscribers 7a, 7b, . . . , 7n and perform an action based on these data or signals.

Alternatively, the interfaces 8, 9, 10 and 11 can be integrated in one module unit and the data bus subscribers 7a, 7b, . . . , 7n can be plugged onto this module unit. The module units can also be referred to as basic elements of the ring bus 6. The ring bus 6 infrastructure is thereby constructed by the module units and the data bus subscribers 7a, 7b, . . . , 7n are interchangeable, so that the ring bus 6 can be constructed with any types of data bus subscribers 7a, 7b, . . . , 7n. With the help of the module units, it is also ensured that even if a data bus subscriber 7a, 7b, . . . , 7n is removed, the communication between the remaining data bus subscribers 7a, 7b, . . . , 7n is not interrupted, because communication takes place over the still existing module units.

Due to their inputs and outputs 13, 14 which can be connected to sensors 15 and actuators 16, the data bus subscribers 7a, 7b, . . . , 7n shown in this exemplary embodiment are also often called I/O modules. Even if in the embodiment shown here, the data bus subscribers 7a, 7b, . . . , 7n are shown as spatially separated from the sensors 15 or actuators 16, the sensors 15 or actuators 16 can also be integrated in the I/O module.

The ring bus 6 shown in the embodiment shown here is based on a cycle frame communication. In this case, the local bus master generates 3 cycle frames which carry data packets, which have a header, a process data part or information data part and a checksum part.

Each data packet is sent from the local bus master 3 in the downlink direction to the first data bus subscriber 7a of the ring bus 6. This receives a first part of the data packet via the interface 8. Such a part of the data packet is also referred to below as a piece or unit. The data bus subscriber 7a then carries out a processing of the part, and then forwards the part to the next data bus subscriber 7b via interface 9; preferably at the same time, the first data bus subscriber 7a receives a second part of the data packet, etc. The size of the parts of the data packet, i.e., the division of the data packet, depends on the receiving capacity of the data bus subscribers 7a, 7b, . . . , 7n; for example, a fixed number of bits, for example 8 bits of the data packet, can be present at the data bus subscriber 7a, 7b, . . . , 7n at the same time for processing.

The data packet accordingly passes through the data bus subscribers 7a, 7b, . . . , 7n unit by unit, piecewise, or partwise, for example, in parts or symbols of 8 bits. The part of the data packet which has been processed by the last data bus subscriber, in the embodiment shown here data bus subscriber 7n, then cycles through the ring bus 6 in the uplink direction, so that starting from the last data bus subscriber 7n, the parts are again sent upwards through all the data bus subscribers 7a, 7b, . . . , 7n towards the local bus master 3. For this purpose, the last data bus subscriber 7n either has a switchable bridge which connects the interface 9 to the interface 10, or a switchable bridge is connected to the last data bus subscriber 7n, which takes over the function of directing the parts of the data packet from the interface 9 to the interface 10. Alternatively, the interface 10 of the data bus subscriber 7n can also be connected directly to the interface 5b of the local bus master 3 with the aid of a bypass line.

The units of the data packet or data packets, as in the exemplary embodiment shown here, can be looped back to the local bus master 3 in the uplink direction without further processing taking place. But it is also conceivable that a further processing of the units of the data packet takes place in the uplink direction, so that the data packet can be processed twice, once in the downlink direction to the last data bus subscriber 7n and once in the uplink direction to the local bus master 3. For example, processing can take place in the uplink direction by signal refresh and/or phase shift.

During processing of the process data in the downlink direction, i.e., away from the local bus master 3, or in the uplink direction, i.e., towards the local bus master 3, the processing is carried out with the aid of instruction lists, the instruction lists containing sets of instructions which can be executed by the processing unit 12 of the data bus subscribers 7a, 7b, . . . , 7n. The instruction lists themselves can be sent to the individual data bus subscribers 7a, 7b, . . . , 7n by the local bus master 3 in an initialization phase. The instruction list can also be sent to the data bus subscribers 7a, 7b, . . . , 7n in a communication data packet from the local bus master 3 directly before the process data packet.

Figure 2:
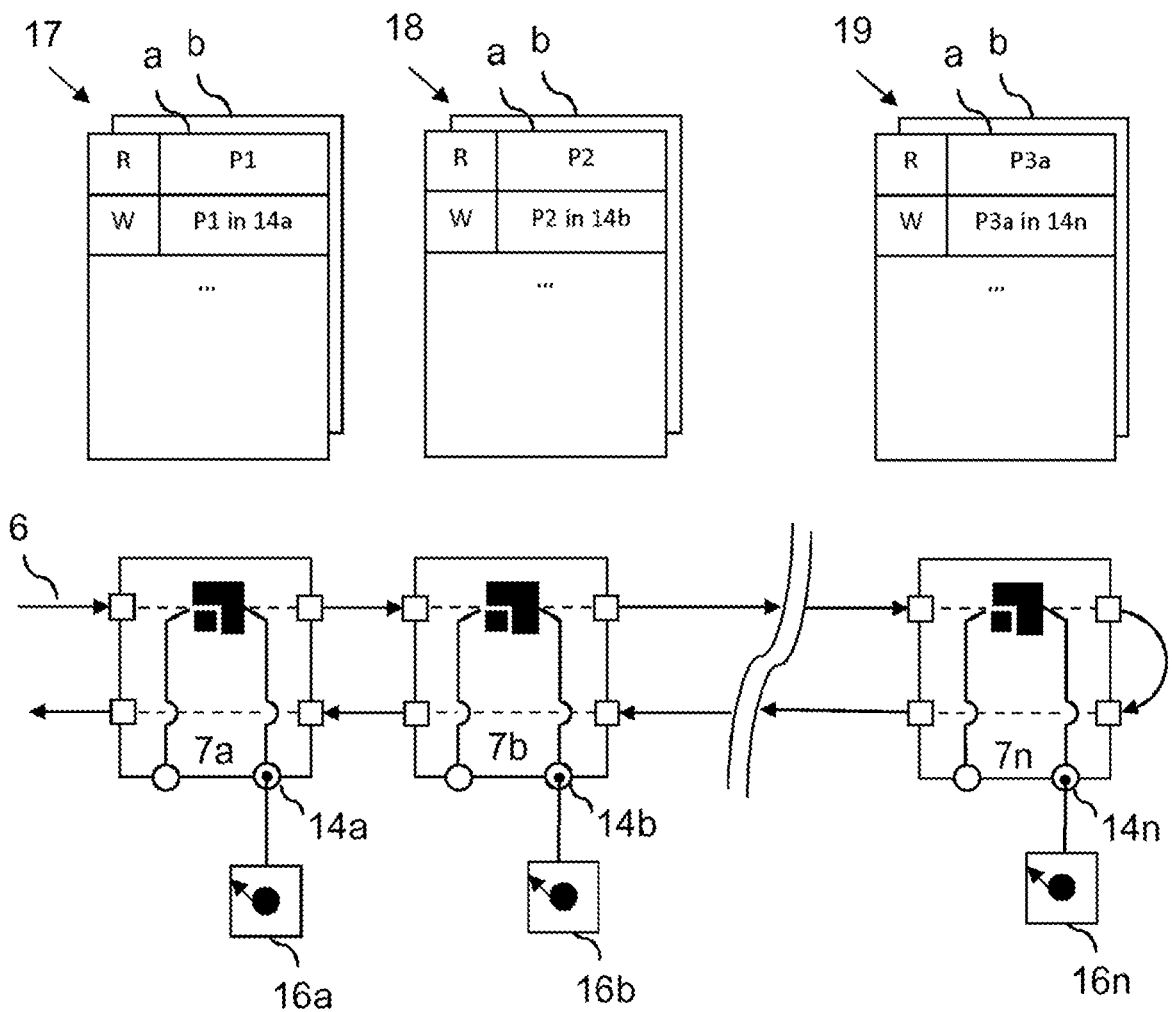
FIG. 2 is a schematic block diagram of an exemplary embodiment of a ring bus and the processing of process data using instruction lists.
Figure 4:
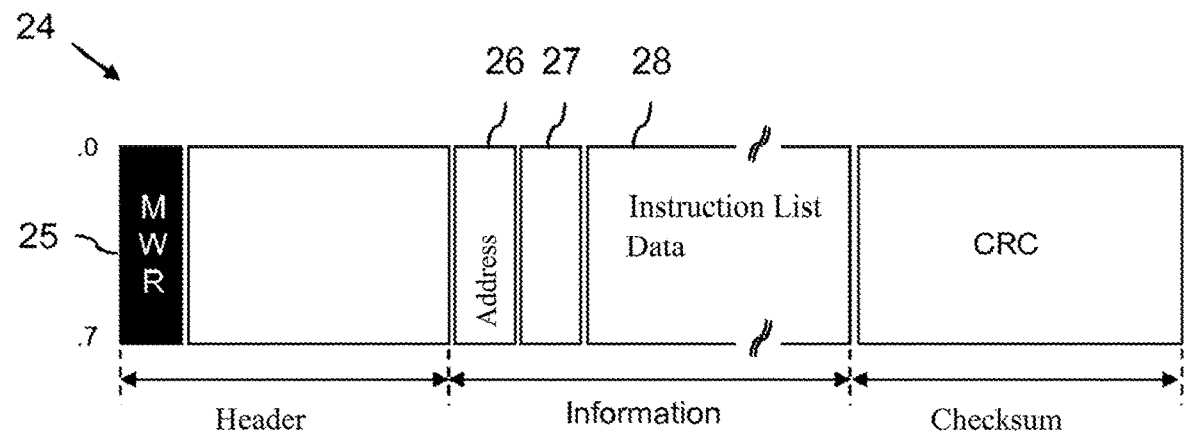
FIG. 4 is a schematic representation of a data packet used by a local bus master with instruction list data.

In the data bus subscribers 7a, 7b, . . . , 7n, the instruction lists are stored indexed, for example. In this case, the index can either refer to the numbers of the instruction list itself or to a memory area in which the instruction list is stored, or the data bus subscriber 7a, 7b, . . . , 7n can have references which point to the instruction lists. An example of the ring bus 6 shown in FIG. 1 with data bus subscriber 7a, 7b, . . . , 7n with stored instruction lists is shown in FIG. 2. An example of indexing by means of references is shown in FIG. 4.

FIG. 2 shows a schematic block diagram of an exemplary embodiment of a ring bus 6 and the processing of process data P1, P2, P3a from a process data packet with the aid of different instruction lists 17, 18, 19. In this case, FIG. 2 shows a part of the ring bus 6 shown in FIG. 1 with the data bus subscribers 7a, 7b, . . . , 7n. Each output 14a, 14b, . . . , 14n of a data bus subscriber 7a, 7b, . . . , 7n is connected to an actuator 16a, 16b, . . . , 16n in the exemplary embodiment shown here. The respective data bus subscribers 7a, 7b, . . . , 7n each have two a/b instruction lists 17, 18, 19. These instruction lists 17, 18 and 19 are stored in memories 25 of the data bus subscribers 7a, 7b, . . . , 7n. Originally, the instruction lists 17, 18 and 19 may have been received by the local bus master 3 and been stored during an initialization phase on the data bus subscribers 7a, 7b, . . . , 7n. The instruction lists 17, 18 and 19 are shown as tables in the exemplary embodiment shown here. However, those skilled in the art will appreciate that other forms of instruction lists 17, 18 and 19 can also be used. In the embodiment shown here, the instruction lists 17, 18 and 19 each contain in the first column the respective instruction to be executed by the data bus subscribers 7a, 7b, . . . , 7n. In this case, an "R" (Read) symbolizes that something is to be read; a "W" (Write) that something is to be written. However, other operations can also be performed, such as "AND", "OR", "NOT", "NOR", "XOR", "NAND", "SHIFT", "SKIP", "INCREMENT", etc. In the second column are the operands with which the operation defined by the instruction is to be executed. The skilled person is aware that the operations to be executed by the data bus subscribers 7a, 7b, . . . , 7n can be stored in the instruction list using software, for example, in the form of functions, or the operations may be realized in terms of hardware by gate circuits present at the data bus subscribers 7a, 7b, . . . , 7n, so that the instruction list only indicates the gates to be run through for the operation. It is clear to the skilled person that, depending on the memory use in the data bus subscribers 7a, 7b . . . , 7n, the instruction lists can be designed more or less complex, from programming code in a high level programming language down to the machine language, i.e., instructions which can be run directly by the processing unit 12 of the data bus subscribers 7a, 7b, . . . , 7n. In this case, the machine code is formed of a sequence of bytes that can represent both commands and data. When generating the instruction lists, the local bus master 3 can immediately send these in machine code to the corresponding data bus subscribers 7a, 7b, . . . , 7n or send them the instruction lists in the form of program code, which is individually compiled by the data bus subscribers 7a, 7b, . . . , 7n and converted into machine language. If the local bus master 3 immediately sends the data bus subscribers 7a, 7b, . . . , 7n the instruction lists in the form of machine language, then this has the advantage that the data bus subscribers 7a, 7b, . . . , 7n do not need an elaborate processing unit 12 because they do not have to be able to compile the received instruction lists. However, if more complex data bus subscribers 7a, 7b, . . . , 7n are used, a compilation on the data bus subscriber 7a, 7b, . . . , 7n itself may be advantageous because in this case the local bus master 3 does not have to have any knowledge about the hardware of the data bus subscriber 7a, 7b, . . . , 7n. However, those skilled in the art will appreciate that the complexity of the instruction lists is adaptable to the complexity of the data bus subscribers 7a, 7b, . . . , 7n.

In the example shown here, for the sake of simplicity, it is not necessary to specify machine code or program code, but instead readable examples are listed. The skilled person is aware that these examples can be implemented in the form of program code or machine code. In addition, the skilled person is aware that the examples given here only serve for the purpose of explanation, without being understood to be limiting.

In the example shown here, the first instruction in the first instruction list 17a for the data bus subscriber 7a is "R", thus Read. What is to be read is in the second column, namely the process data P1. In this case, process data P1, for example, can be presented as a bit or bit range, for example, a maximum of 8 bits corresponding to one unit of the data packet, of the cycle frame looped through the ring bus. The second instruction in the first instruction list 17a is called "W", i.e., Write. What is to be written, and where to, is defined in the second column, namely the read process data P1 to the output 14a of the data bus subscriber 7a. The writing of the process data 7a to the output 14a here means, for example, that the actuator 16a is given a desired value or control value on the basis of which the actuator 16a carries out an action. Preferably, the values of the process data for the inputs or outputs are buffered in a memory 30. The instruction lists 18a and 19a of the data bus subscribers 7b and 7n have instructions, except that here, process data P2 and P3 are read and written to the respective outputs 14b and 14n of the data bus subscribers 7b and 7n. The person skilled in the art is aware that it is also possible to read from the inputs 13a, 13b, 13n of the respective data bus subscribers 7a, 7b, . . . , 7n, that is, for example, a measured value can be read from a sensor 15 associated with the inputs 13a, 13b, 13n and the corresponding measured value can be written as a process data item into a part of the process the data packet presently at the data bus subscriber 7a, 7b, . . . , 7n.

Each of the data bus subscribers 7a, 7b, . . . , 7n shown in this embodiment has two instruction lists 17a and 17b, 18a and 18b, 19a and 19b. These instruction lists 17, 18, 19 can be intended for different operating modes of the data bus subscribers 7a, 7b, . . . , 7n. For example, the instruction lists 17a, 18a and 19a are used in normal operation, whereas the instruction list 17b, 18b and 19b are used in the event of an error. It is however also conceivable that during normal operation different instruction lists 17, 18, 19 are used to generate a different behavior of the ring bus 6, for example, two configurations for two tools of a robot, etc. With the help of the instruction list index, the data bus subscribers 7a, 7b, . . . , 7n can be informed which of the instruction lists a or b should be used.

It is clear to the skilled person that the instruction lists 17, 18 and 19 shown in this exemplary embodiment and the instructions named above are understood to be only exemplary and that the instruction lists 17, 18, 19 can comprise any kind of instruction and can be arbitrarily deposited in the memory 30 of the data bus subscribers 7a, 7b, . . . , 7n or may be stored in a memory to which the data bus subscribers 7a, 7b, . . . , 7n at least have access. The possible instructions or sets of instructions thereby solely depend on how many cycles the individual data bus subscribers 7a, 7b, . . . , 7n are given for processing. If the data bus subscribers 7a, 7b, . . . , 7n are restricted to two work cycles, for example, the person skilled in the art is aware that the set of possible instructions that can be processed is also limited. Preferably, therefore, only a fixed set of commands is used.

The generation of the instruction lists 17, 18, 19 and their provision to the data bus subscribers 7a, 7b, ..., 7n is preferably executed by the local bus master 3. The latter can send the generated instruction lists 17, 18, 19 to the individual data bus subscribers 7a, 7b, ..., 7n in an initialization phase. The local bus master 3 can then prepend an instruction list index to the process data P1, P2, P3 and inform the data bus subscribers 7a, 7b, ..., 7n from the instruction list index which instruction list 17a/b, 18a/b, 19a/b should be used for the process data P1, P2, P3. The local bus master 3 can thus inform the data bus subscribers 7a, 7b, ..., 7n as a function of the desired operating mode as to which instruction list 17a/b, 18a/b, 19a/b should be used. If the local bus master 3 detects an error, the local bus master 3 can send an instruction list index assigned to the error or to a special error image in order to set the ring bus 6 to a special error mode. For example, such error instruction lists only contain instructions that stop the actuators or move them to an error position. Preferably, only the local bus master 3 is permitted to change the instruction list index. The local bus master 3 can control a safety function by means of the instruction lists associated with the instruction list index.

Figure 3:
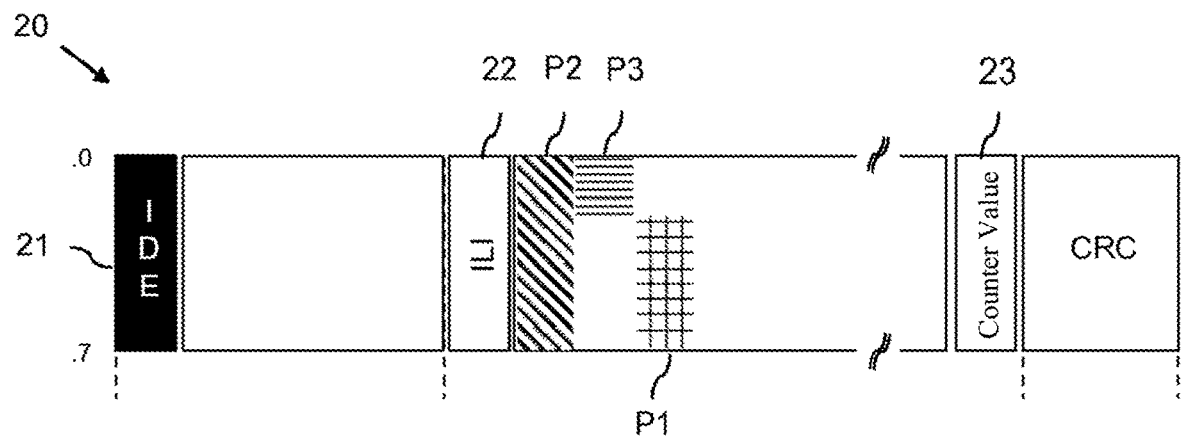
FIG. 3 is a schematic representation of a data packet used by a local bus master with instruction list index and process data.

FIG. 3 shows a schematic representation of an example of a data packet 20 generated by a local bus master 3 with process data P1, P2, P3 and an instruction list index, ILI, in the field 22. The data packet 20 shown here has at least one general header, one information part and one checksum part. The data packet 20 shown can also be referred to as a process data packet.

The header includes a field 21 which contains a unique bit pattern IDE that occurs only once, which may also be referred to as an identifier or codeword. The codeword defines the beginning of a packet. The coding ensures that the codeword cannot occur again randomly within the data packet 20. The number and design of unique bit patterns or codewords depend on the coding used on the ring bus 6. Alternatively, or additionally, however, special bit patterns or codewords can also be defined in the bus protocol used. It is only important that the data bus subscribers 7a, 7b, ..., 7n can uniquely detect from the bit pattern or codeword of the field 21 that process data P1, P2, P3, ... is included in the data packet 20. In the illustrated exemplary embodiment, the data bus subscribers 7a, 7b, ..., 7n have the knowledge that when a field 21 is received with a bit pattern IDE, the data following in the data packet 20 contain process data P1, P2, P3.

The header can also include more information, which, for example, indicates whether the data packet 20 is moving in the downlink or in the uplink direction. For this purpose, for example, the last data bus subscriber 7n can write information into the header that the data packet 20 has already passed through this data bus subscriber 7n and has been sent back in the direction of the local bus master 3.

However, other fields are also known to the person skilled in the art which can be written into a header of a data packet 20, which can be used by the data bus subscribers 7a, 7b, ..., 7n for control or error detection.

At the start of the process data or before the process data, the information part of the data packet 20 may have an instruction list index 22, ILI, which indicates which instruction list 17a/b, 18a/b, 19a/b the data bus subscribers 7a, 7b, ..., 7n should use. The instruction list index 22 is spaced at a constant distance from the IDE 21 and thus located at a predetermined location within the data packet 20. As an alternative to the exemplary embodiment in FIG. 3, the instruction list index 22 may also be immediately adjacent to the IDE 21 or may be fixedly positioned relative to another uniquely identifiable field of the data packet 20. This allows for the data bus subscriber 7a, 7b, ..., 7n to advantageously determine and read out the instruction list index 22 based on its arrangement in the data packet 20.

The instruction list index 22 can be provided, for example, in normal operation of the ring bus 6 that all data bus subscribers 7a, 7b, ..., 7n use their first instruction list 17a, 18a, 19a, whereas in the event of an error, the second instruction list 17b, 18b, 19b is to be used.

The information part (payload) furthermore has the actual process data P1, P2 and P3. This process data P1, P2, P3 is shown with different patterns in the exemplary embodiment shown here. In the exemplary embodiment shown here, the process data P1 is intended for the data bus subscriber 7a in the ring bus 6, the process data P2 is intended for the data bus subscriber 7b in the ring bus 6 and the process data P3 is intended for the data bus subscriber 7n in the ring bus 6. Intended in this context means that the respective process data P1, P2, P3 is suitable to be used by the data bus subscriber 7a, 7b, ..., 7n for which it is intended, to perform, for example, a control, regulation or evaluation at this specific data bus subscriber 7a, 7b, ..., 7n. In an alternative embodiment, process data P1, P2, P3 may also be intended for two data bus subscribers 7a, 7b, ... 7n.

In addition, the data packet 20 in the information part also includes a field 23, which may be configured as a counter value and which can be incremented or decremented by each data bus subscriber 7a, 7b, ..., 7n through which the data packet 20—or the part of the data packet 20 containing the counter value—has already been routed. This makes it possible for the local bus master 3 to check whether the data packet 20 has been processed by all the data bus subscribers 7a, 7b, ..., 7n.

In addition, the data packet 20 may also have a test part with which a cyclic redundancy check, CRC, can be performed.

By programming the data bus subscribers 7a, 7b, ..., 7n with instruction lists 17, 18, 19 and with the possibility of instructing the data bus subscribers 7a, 7b, ..., 7n with each data packet 20 to use a specific instruction list 17a/b, 18a/b, 19a/b corresponding to the desired operating mode, a simple way is provided with which the behavior of a ring bus 6 can be changed during operation.

Thus, it is possible to provide a decentralized processing of the process data P1, P2, P3 by the data bus subscribers 7a, 7b, ..., 7n by means of the ring bus 6 structure and by using the instruction list indexes and the instruction lists 17, 18, 19, at the same time with centralized processing and control by the local bus master 3. Via the instruction list index and the previously programmed instruction lists 17, 18, 19, the local bus master 3 as a central element drives the individual data bus subscribers 7a, 7b, ..., 7n in such a way that a total processing of the process data P1, P2, P3 by all data bus subscribers 7a, 7b, ..., 7n of the ring bus 6 takes place. In addition, the individual data bus subscribers 7a, 7b, ..., 7n can have their own intelligence, for example a microcontroller, in particular for communication, i.e., for communication without process data P1, P2, P3, for example, for programming the instruction lists 17, 18, 19.

FIG. 4 shows a schematic representation of a data packet 24 for programming a data bus subscriber 7a, 7b, ..., 7n. This data packet 24 may also be referred to as a communication data packet and may be inserted during an ongoing communication in order to send an instruction list 17, 18, 19 to a data bus subscriber 7a, 7b, ..., 7n. The data packet 24 can be embedded in a sequence of data packets of the current cyclical communication and be used to program a data bus subscriber 7a, 7b, ..., 7n. The programming of the one data bus subscriber 7a, 7b, ..., 7n takes place with the help of instruction list information, which is sent in the data packet 24 to the data bus subscriber 7a, 7b, ..., 7n to be programmed.

The data packet 24 includes a general header, an information part and a checksum part. The header includes a field 25 which contains a unique bit pattern MWR occurring only once, which may also be referred to as a codeword or identifier. The data bus subscribers 7a, 7b, ..., 7n have the knowledge that when the bit pattern MWR occurs, data is made available to the data bus subscribers 7a, 7b, ..., 7n. In this case, the data can be only the instruction lists 17, 18, 19 for the data bus subscribers 7a, 7b, ..., 7n for programming the data bus subscribers 7a, 7b, ..., 7n. The head of the data packet 24 may also include additional information which is necessary for control or error detection.

The information part of the data packet 24 includes a field 26 in which the address of the data bus subscriber 7a, 7b, ..., 7n to be addressed is stored. Only the data bus subscriber 7a, 7b, ..., 7n whose address matches the address stored in the field 26 reads the instruction list data 28 of the information part of the data packet 24. The information part may also have an additional field 27 which can be used by the corresponding data bus subscriber 7a, 7b, ..., 7n whose address is stored in field 26 for error detection, error propagation, or this field 27 may contain instructions as to where the instruction list data 28 should be stored. The instruction list data 28 may include at least one instruction list 17, 18, 19 or multiple instruction lists. After storing the at least one instruction list 17, 18, 19 in the respective data bus subscribers 7a, 7b, ..., 7n, it can also be said that the programming of the data bus subscribers 7a, 7b, ..., 7n has taken place. The instruction lists 17, 18, 19 thereby include sets of instructions which define the processing performed by the data bus subscribers 7a, 7b, ..., 7n. In addition, the data packet 24 may also include a checksum part, with which a cyclic redundancy check can be carried out.

The instruction lists 17, 18, 19 and the instruction list index also allow for a newly added data bus subscriber to be programmed during operation without interrupting operation. In this case, for example, a communication data packet 24 must only be embedded in the cyclic communication, which allows for the new data bus subscriber to be programmed with an instruction list 17, 18, 19. If, for example, a data bus subscriber is added to the ring bus 6, then this can identify itself to the local bus master 3. The local bus master 3 will then reserve an unused instruction list index and generate one or more instruction lists for the new data bus subscriber. The local bus master will also program 3 instruction lists in the remaining data bus subscribers 7a, 7b, ..., 7n of the ring bus, which are assigned to the new, previously unused instruction list index. While this programming is ongoing, the process continues with a previously used instruction list index, wherein the newly added data bus subscriber cannot yet process any process data P1, P2, P3.

In the example shown in FIG. 2, the data bus subscribers 7a, 7b, ..., 7n each have two instruction lists 17a/b, 18a/b and 19a/b, accordingly, the instruction list index "one" and "two" are already used. Accordingly, an unused instruction list index is "three". The newly generated one or more instruction lists are then sent to the new data bus subscriber using a communication data packet 24 and will be located by using the unused instruction list index. This may mean, for example, that the at least one new instruction list is deposited at the third position in the memory of the newly added data bus subscriber. Alternatively, the new instruction list can also be deposited anywhere in the memory of the newly added data bus subscriber. In this case, however, a reference is created that points to the location in the memory of the new instruction list. In this case, the index of the reference corresponds to the unused instruction list index.

The remaining (previous) data bus subscribers 7a, 7b, ..., 7n can also be programmed in this step. In this case, the local bus master 3 can also send the data bus subscribers 7a, 7b, ..., 7n a "third" instruction list, for example by means of communication data packets, which is stored accordingly in the data bus subscriber 7a, 7b, ..., 7n. Alternatively to programming all data bus subscribers 7a, 7b, ..., 7n with a "third" instruction list, the remaining data bus subscribers 7a, 7b, ..., 7n can also be instructed to create a reference, which can be found by the as yet unused instruction list index and which points to the currently used instruction list 17a/b, 18a/b, and 19a/b.

With the next process data package 20, the local bus master 3 can then send all data bus subscribers 7a, 7b, ..., 7n an instruction list index that points to the "third" instruction list. In this way, seamless integration of the newly added data bus subscriber is possible without significant disruption of communication on the ring bus 6. Therefore, seamless switching is possible by means of the instruction list index.

The adding and removing of instruction lists 17, 18, 19 for different operating modes of the unmodified ring bus 6 is possible during operation in a similar manner. First, an unused instruction list index is identified, i.e., an instruction list index to which no instruction list 17, 18, 19 is assigned. This identification can be carried out by the local bus master 3 who, for example, has information about which instruction lists are stored in the individual data bus subscribers 7a, 7b, ..., 7n and via which instruction list indexes they can be located. After identification, new instruction lists are generated. The new instruction lists are then sent to the data bus subscribers 7a, 7b, ..., 7n which are to receive a new instruction list, for example with corresponding communication data packets 24. The new instruction lists are then stored at a location that is discoverable with the unused instruction list index or which can be found by a reference. Thereafter, the local bus master 3 can send all data bus subscribers 7a, 7b, ..., 7n an instruction list index pointing to the new instruction lists. In this way, a seamless transition is possible even during operation.

Figure 5:
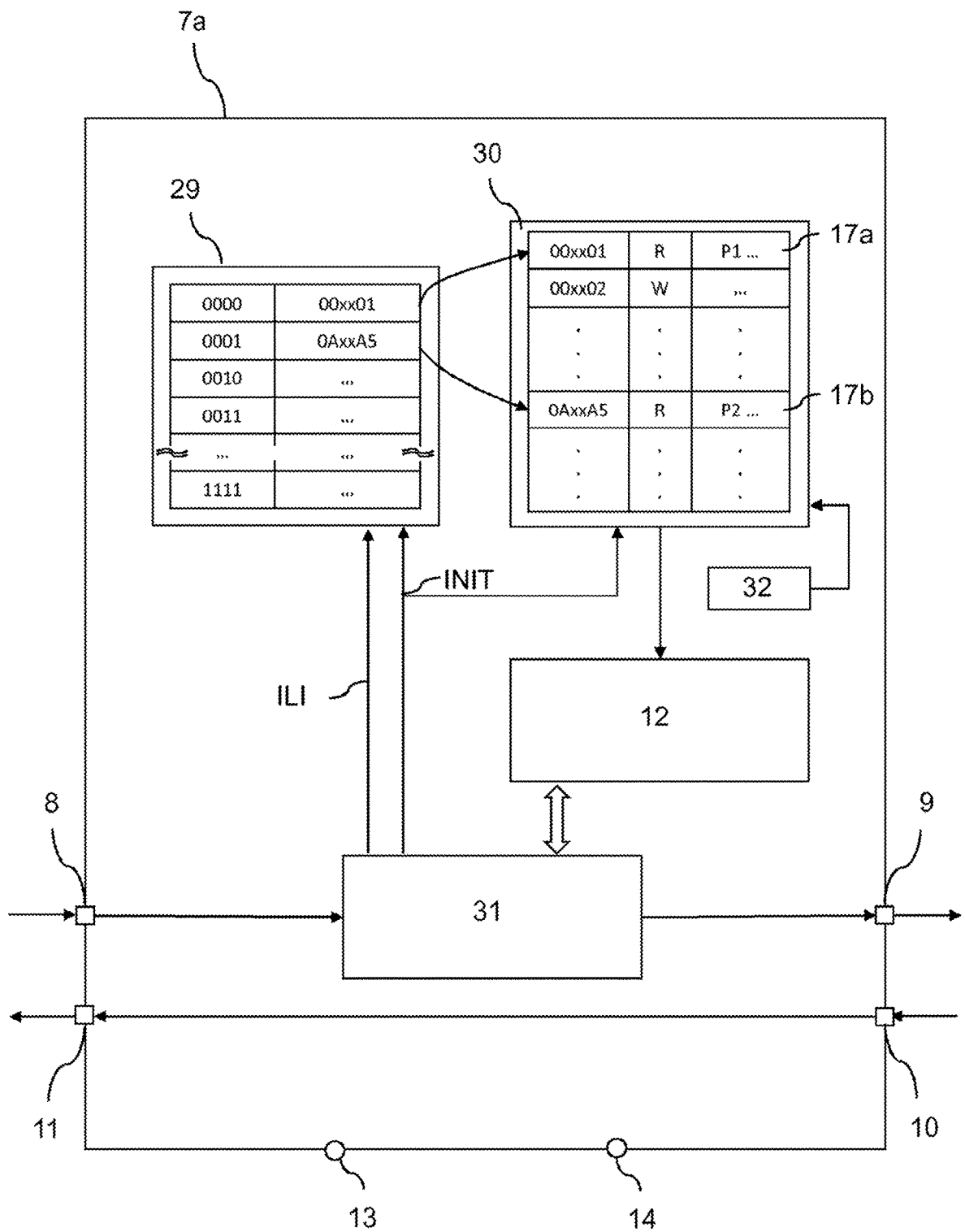
FIG. 5 is a schematic representation of an inventive data bus subscriber.

FIG. 5 schematically shows a data bus subscriber 7a. The data bus subscriber 7a is shown here only by way of example and it is to be understood that the remaining data bus subscribers 7b, ..., 7n can have the same structure. The data bus subscriber 7a has an interface 8 for receiving and an interface 9 for sending data packets 20, 24 or parts of the data packets 20, 24 in the downlink direction, i.e., away from the local bus master 3, as well as the interfaces 10 and 11 for forwarding the data packets 20, 24 or parts of the data packets 20, 24 in the uplink direction, i.e., towards the local bus master 3. As shown in the embodiment shown here, processing takes place only in the downlink direction rather than in the uplink direction. This is indicated by the direct connection between the interfaces 10 and 11.

In the exemplary embodiment shown here, the data bus subscriber 7a has a conversion table 29 (Look-Up table, LUT). This conversion table 29 has two columns and several rows in the exemplary embodiment shown here and is stored in the memory or register of the data bus subscriber 7a. The first column of the conversion table 29 has the value range 0 to 15 in binary coding. The first column accordingly comprises the values 0000 (0), 0001 (1), 0010 (2), 0011 (3), 0100 (4), 0101 (5), 0110 (6), 0111 (7), 1000 (8), 1001 (9), 1010 (10), 1011 (11), 1100 (12), 1101 (13), 1110 (14), 1111 (15). In the second column, each value of the first column is assigned a specific memory address in a memory 30. These memory addresses can also be referred to as references, wherein each reference is discoverable via a specific value of 0 to 15.

Accordingly, the reference in the exemplary embodiment shown here contains a memory address. The memory address thereby points to a location in the memory 30 where a first instruction is stored in a corresponding instruction list 17a, 17b. The instructions following in the list are selected by a counter value 32 which correspondingly increments the address. Thus, for example, the reference indexed with the binary value 0000 points to the memory address 00xx01 in the memory 30. In the memory 30 of the data bus subscriber, the first instruction of the instruction list 17a is located at the memory address 00xx01.

In this case, the instruction list 17a can have an instruction for each symbol or each process data item P1, P2, P3 in the data packet (20). If certain process data is not to be processed, the instruction list 17a may have a "SKIP" instruction at this point. The counter value 32 indicates which of the process data items P1, P2, P3 is currently being processed by the data bus subscriber 7a, 7b, . . . , 7n and accordingly, the counter value 32 indicates the instruction currently being used from the instruction list 17a. After processing, the counter value 32 is changed so that the next instruction from the instruction list 17a is used with the next process data item P1, P2, P3. It is clear to the skilled person that process data P1, P2, and P3 indicated here can only fill out one part of a symbol, wherein the symbol may include, for example, 8 bits, i.e., 1 byte.

If the second instruction list 17b is to be used, the reference is addressed via the instruction list index, which is indexed with the second binary value 0001 and points to the memory address 0AxxA5. In the memory 30 of the data bus subscriber, the first instruction of the instruction list 17b is located at the memory address 0AxxA5. In the exemplary embodiment shown here, up to 16 references can thus be indexed, i.e., up to 16 instruction lists can be found in the memory of the data bus subscriber 7a, wherein the instruction lists have an instruction each for each process data P1, P2, P3 or have an instruction for each symbol in which the process data P1, P2 and P3 is contained.

The instruction lists 17a/17b may have been sent to the data bus subscriber 7a during an initialization phase or during operation, for example by means of a communication data packet 24. The data bus subscriber 7a receives the instruction lists 17a/b via the interface 8, which is assigned a receiver/transmission circuit 31. The data bus subscriber 7a can then be instructed to create the conversion table 29, or to enter a reference for each newly obtained instruction list 17a/b at a place in the conversion table 29 not yet used, which refers to the memory address of the newly added instruction list 17a/b. For example, the data bus subscriber can receive the first instruction list 17a, store it in the memory 30 from the location 00xx01 and store a reference to this memory address at the first location in the conversion table 29. The corresponding reference is therefore indexed with the binary value 0000. When the data bus subscriber receives the second instruction list 17b, then the data bus subscriber 7a can deposit this, for example, in the memory starting from location 0AxxA5 and deposit a corresponding reference at the second location in the conversion table 29. The corresponding reference is therefore indexed with the binary value 0001.

During the operation of the data bus subscriber 7a, the latter receives via the interface 8 parts of the data packet 20 at the receiver circuit 31. A part of the data packet 20 is the instruction list index field 22. This field 22 contains a value which corresponds to a location in the conversion table 29. For example, the instruction list index field 22 may include a binary value 0001. This value indexes the reference to the memory address 0AxxA5, that is, refers to the second instruction list 17b of the data bus subscriber 7a.

The processing unit 12 of the data bus subscriber 7a is therefore instructed via the instruction list index field 22 to use the second instruction list 17b to process the process data P1, P2, P3, . . . which follows the instruction list index field 22.

Those skilled in the art will understand that although in this embodiment, the second instruction list 17b has been referenced by way of example using the instruction list index field 22, the instruction list index field 22 may also assume other values, and thus other references are indexed which may point to other instruction lists held in the memory 30.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for processing process data by data bus subscribers of a local bus the method comprising:
   receiving at least two instruction lists at a data bus subscriber from a local bus master, each instruction list of the at least two instruction lists comprising a set of instructions for processing process data;
   storing the at least two instruction lists in a memory;
   receiving an instruction list index at the data bus subscriber from the local bus master, the instruction list index referencing an indexable list of instruction lists;
   selecting one of the at least two stored instruction lists based on the received instruction list index when the instruction list index from the local bus master is associated with one of the at least two stored instruction lists from the local bus master; and
   executing the set of instructions of the selected instruction list for processing the process data by the data bus subscriber.

2. The method according to claim 1, wherein the storing of the at least two instruction lists comprises:
   creating a reference to each instruction list of the at least two stored instruction lists; and/or
   storing each instruction list of the at least two instruction lists at a predetermined location in the memory.

3. The method according to claim 1, wherein the received instruction list index points to a memory location in which one of the at least two instruction lists are stored.

4. The method according to claim 1, wherein the at least two instruction lists are transmitted to the data bus subscriber by the local bus master of the local bus.

5. The method according to claim 1, wherein the instruction list index is received before the process data, the instruction list index corresponding to one of the at least two instruction lists, the at least two instruction lists being indexed in the indexable list.

6. The method according to claim 1, wherein the process data is received in a data packet.

7. The method according to claim 6, wherein the data packet includes the instruction list index and the process data.

8. The method according to claim 6, wherein the data packet is arranged in a cycle frame.

9. The method according to claim 1, wherein each instruction list of the at least two instruction lists is assigned only one unique instruction list index.

10. The method according to claim 1, wherein each of the data bus subscribers including the data bus subscriber have the instruction list index,
wherein the at least two data bus subscribers utilize the instruction list index, the instruction list index being the same in each of the data bus subscribers of the local bus.

11. A method for processing process data by data bus subscribers of a local bus, in particular of a ring bus, the method comprising:
receiving at least two instruction lists at a data bus subscriber, the instruction lists comprising a set of instructions for processing process data;
storing the at least two instruction lists in a memory;
receiving an instruction list index at the data bus subscriber;
selecting one of the at least two stored instruction lists based on the received instruction list index when a reference to the instruction list index is associated with one of the at least two stored instruction lists; and
executing the set of instructions of the selected instruction list for processing the process data by the data bus subscriber,
wherein a first instruction list of the at least two received instruction lists has a first set of instructions for process data in a first arrangement within a data packet and wherein a second instruction list of the at least two received instruction lists has a second set of instructions for process data in a second arrangement within a data packet, and
wherein the first arrangement differs from the second arrangement.

12. A data bus subscriber of a local bus the data bus subscriber comprising:
a receiver circuit to connect with the local bus and receiving at least two instruction lists from a local bus master, wherein each of the instruction lists includes a set of instructions for processing process data and the receiver circuit receiving an instruction list index from the local bus master, the instruction list index referencing an indexable list of instruction lists;

a first arithmetic circuit to select one of the at least two instruction lists based on the received instruction list index when the instruction list index from the local bus master is associated with one of the at least two instruction lists from the local bus master; and
a circuit or digital logic adapted to execute the set of instructions of the selected instruction list for processing the process data.

13. The data bus subscriber according to claim 12, wherein the processing of the process data based on the set of instructions of the selected instruction list comprises at least the reading and/or writing of process data.

14. The data bus subscriber according to claim 12, wherein each instruction list of the at least two instruction lists is assigned only one unique instruction list index.

15. The data bus subscriber according to claim 12, wherein the instruction list index includes indices for the at least two instruction lists from the local bus master.

16. The data bus subscriber according to claim 12, further comprising:
a memory capable of storing the at least two instruction lists.

17. A local bus system comprising:
the local bus master;
at least two data bus subscribers of the local bus according to claim 12,
wherein the local bus master comprises:
a second arithmetic circuit generating a data packet with the instruction list index and the process data; and
a transceiver circuit transmitting the data packet to at least one data bus subscriber of the at least two data bus subscribers,
wherein the at least two data bus subscribers utilize the indexable list, the instruction list index being received in each of the at least two data bus subscribers.

18. The local bus system according to claim 17, wherein the local bus master:
generates at least one instruction list for the at least one data bus subscriber, and
transmits the instruction list to the at least one data bus subscriber.

19. The local bus system according to claim 17, wherein the local bus master further comprises:
a detecting processor to detect that at least one instruction list index is not assigned an instruction list,
wherein the local bus master assigns the one instruction list index to exactly one instruction list.

* * * * *